US011613267B2

(12) United States Patent
Koike et al.

(10) Patent No.: US 11,613,267 B2
(45) Date of Patent: Mar. 28, 2023

(54) VEHICLE AND CONTROL DEVICE OF THE SAME

(71) Applicant: HONDA MOTOR CO., LTD., Tokyo (JP)

(72) Inventors: Satoshi Koike, Wako (JP); Ryuichi Hata, Wako (JP); Naoyuki Kubo, Wako (JP); Takayuki Sakata, Wako (JP); Masayasu Yoshida, Wako (JP); Mitsuru Nonaka, Tokyo (JP); Seiichi Kato, Tokyo (JP); Masanori Yoshihira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 92 days.

(21) Appl. No.: 17/177,536

(22) Filed: Feb. 17, 2021

(65) Prior Publication Data
US 2021/0284156 A1    Sep. 16, 2021

(30) Foreign Application Priority Data

Mar. 11, 2020    (JP) .............................. JP2020-042103

(51) Int. Cl.
*B60W 50/08*    (2020.01)
*B60W 60/00*    (2020.01)

(52) U.S. Cl.
CPC ........ *B60W 50/08* (2013.01); *B60W 60/0013* (2020.02); *B60W 60/0016* (2020.02); *B60W 60/00253* (2020.02)

(58) Field of Classification Search
CPC combination set(s) only.
See application file for complete search history.

(56) References Cited

U.S. PATENT DOCUMENTS

| | | | | |
|---|---|---|---|---|
| 9,886,841 | B1* | 2/2018 | Nave | B60W 10/04 |
| 10,685,513 | B2* | 6/2020 | Godet | G07C 9/00309 |
| 11,040,619 | B1* | 6/2021 | Martin | G06T 7/593 |
| 2019/0063941 | A1* | 2/2019 | Walenty | G01C 21/362 |
| 2019/0272760 | A1* | 9/2019 | Mcquillen | G08G 1/163 |
| 2019/0318159 | A1* | 10/2019 | Blanc-Paques | G06Q 50/30 |
| 2020/0094830 | A1 | 3/2020 | Ito et al. | |
| 2020/0168102 | A1* | 5/2020 | Kamata | G05D 1/0088 |
| 2021/0016773 | A1 | 1/2021 | Sugawara et al. | |
| 2021/0138959 | A1* | 5/2021 | Soni | G08G 1/005 |
| 2021/0152997 | A1* | 5/2021 | Manivasagam | B60W 60/0027 |
| 2021/0188293 | A1* | 6/2021 | Taveira | B62D 39/00 |
| 2021/0366288 | A1* | 11/2021 | Kim | G08G 1/22 |
| 2022/0032770 | A1* | 2/2022 | Hayashi | B60W 30/17 |

FOREIGN PATENT DOCUMENTS

| | | |
|---|---|---|
| JP | 2019-1227 A | 1/2019 |
| JP | 2019-156197 A | 9/2019 |

* cited by examiner

*Primary Examiner* — Anne Marie Antonucci
*Assistant Examiner* — Amelia Vorce
(74) *Attorney, Agent, or Firm* — WHDA, LLP

(57) ABSTRACT

A control device of a vehicle is provided. The device controls travelling of the vehicle such that the vehicle follows another vehicle based on information received from the other vehicle; and determines whether to allow the vehicle to start to follow another vehicle based on at least one of whether a user of the vehicle is inside the vehicle or an instruction from the user. The processor starts to follow another vehicle in a case where the travel control circuit is allowed to follow the other vehicle.

9 Claims, 3 Drawing Sheets

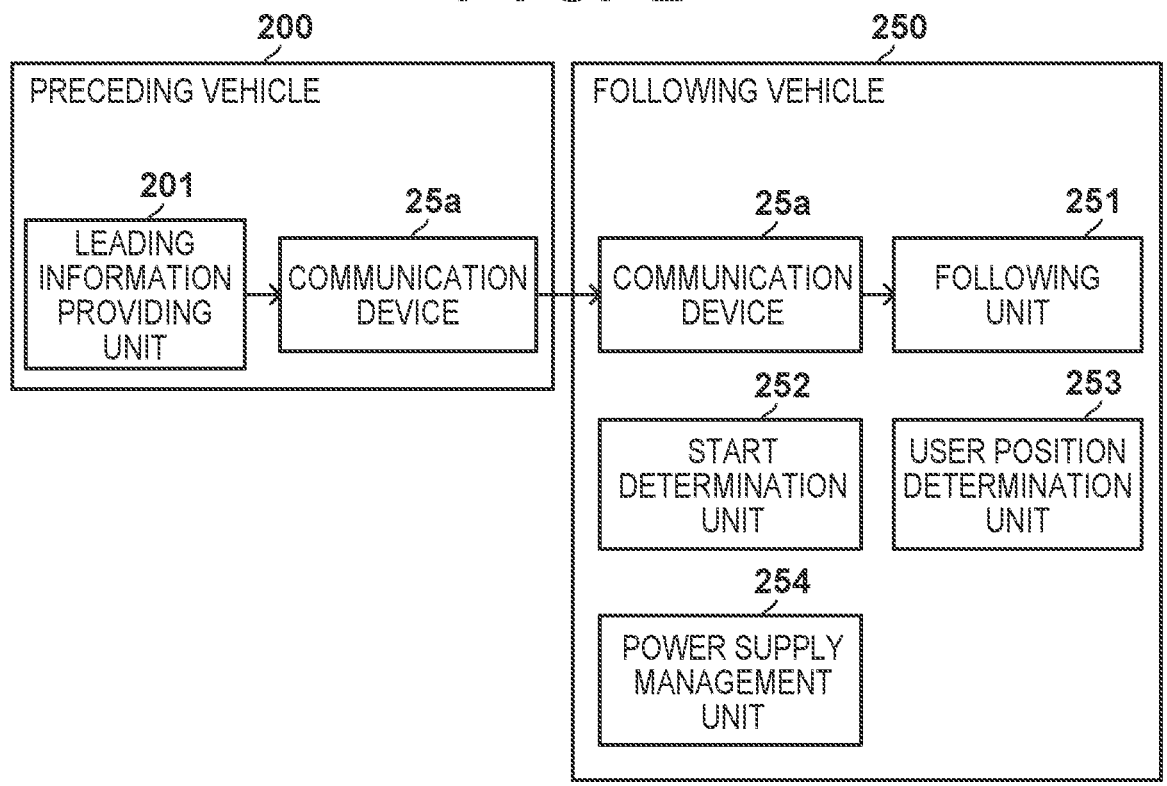

VEHICLE AND CONTROL DEVICE OF THE SAME

CROSS-REFERENCE TO RELATED APPLICATION(S)

This application claims priority to and the benefit of Japanese Patent Application No. 2020-042103 filed on Mar. 11, 2020, the entire disclosure of which is incorporated herein by reference.

BACKGROUND OF THE INVENTION

Field of the Invention

The present invention relates to a vehicle and a control device of the vehicle.

Description of the Related Art

Technologies for electronically coupling a following vehicle to a preceding vehicle so that the following vehicle automatically follows the preceding vehicle are known. In Japanese Patent Laid-Open No. 2019-1227, the following vehicle is controlled to keep a closest proximity distance to the preceding vehicle at a preset distance. In Japanese Patent Laid-Open No. 2019-156197, a movement state of the preceding vehicle is restricted based on the performance of the following vehicle.

Assume that the following vehicle automatically starts to follow the preceding vehicle that has arrived at a position at which the preceding vehicle can lead the following vehicle. In a case where an occupant of the following vehicle is temporarily staying outside the vehicle while waiting for the preceding vehicle to arrive or a case where loading of the following vehicle with cargo has not been finished, if the following vehicle automatically starts to follow the preceding vehicle, the occupant or the cargo will be left behind. On the other hand, in a case where the occupant of the following vehicle wants to keep sleeping within the vehicle, if the occupant is asked whether leading is to be started, the occupant will be bothered.

SUMMARY OF THE INVENTION

In one aspect of the present invention, a following vehicle starts to follow a preceding vehicle as intended by a user of the following vehicle.

According to an embodiment, a control device of a vehicle is provided. The device includes a memory for storing computer readable code and a processor operatively coupled to the memory. The processor is configured to control travelling of the vehicle such that the vehicle follows another vehicle based on information received from the other vehicle, and determines whether to allow the vehicle to start to follow another vehicle based on at least one of whether a user of the vehicle is inside the vehicle or an instruction from the user. The processor starts to follow another vehicle in a case where the vehicle is allowed to follow the other vehicle.

BRIEF DESCRIPTION OF THE DRAWINGS

FIG. 2 is a block diagram showing an example configuration of an electronically coupled travelling system according to various embodiments.

FIG. 3 is a schematic diagram showing an example of a table for managing instructions from a user according to various embodiments.

DESCRIPTION OF THE EMBODIMENTS

The following describes an embodiment in detail with reference to the accompanying drawings. Note that the following embodiment does not limit the invention according to the claims, and all combinations of features described in the embodiment are not necessarily essential for the invention. Two or more of the features described in the embodiment may also be combined. The same or similar configurations are denoted with the same reference signs, and a redundant description of which is omitted.

Figure 1:
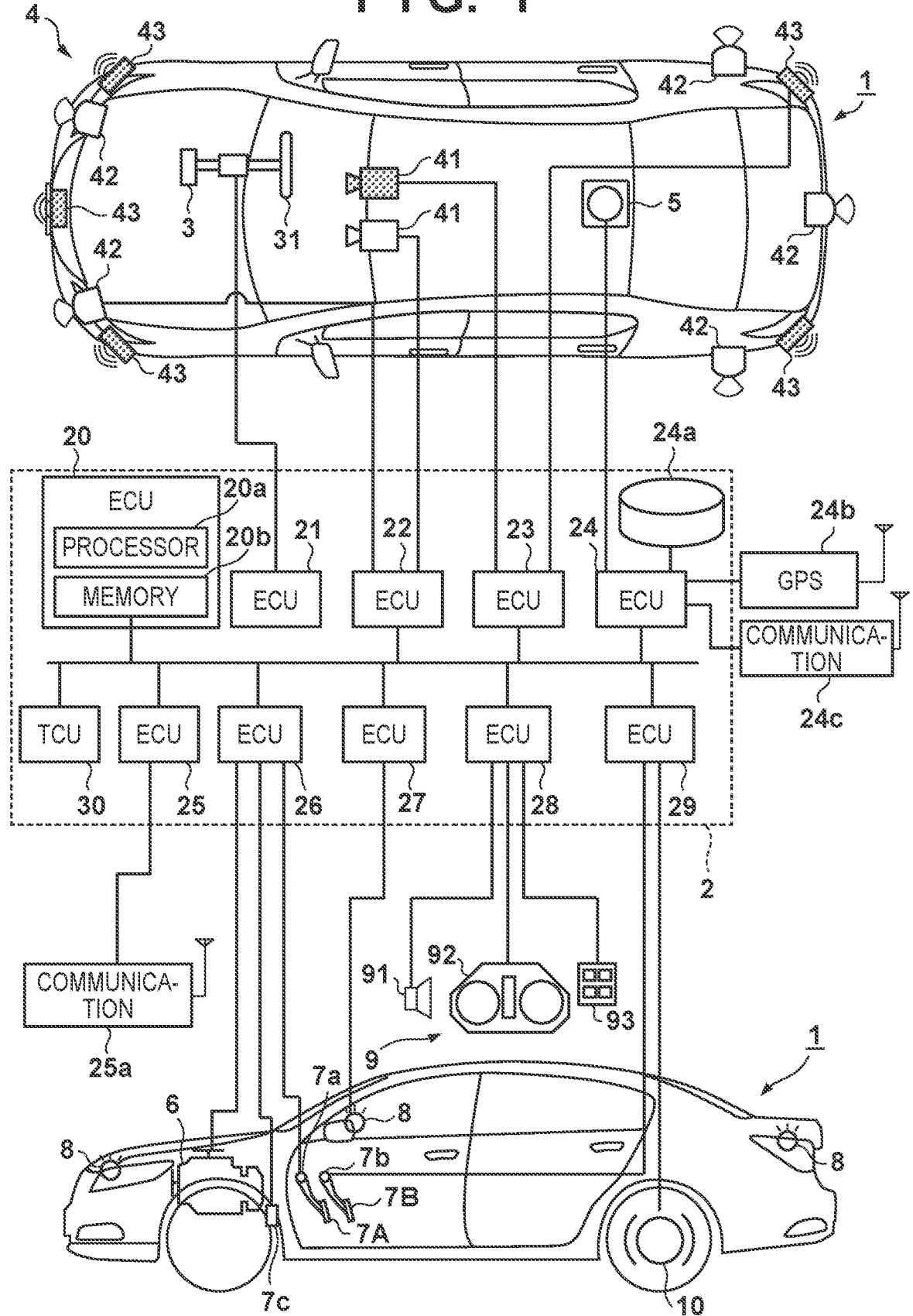
FIG. 1 is a block diagram showing an example configuration of a vehicle according to various embodiments.

FIG. 1 is a block diagram of a vehicle 1 according to various embodiments of the present invention. FIG. 1 shows a schematic plan view and a schematic side view of the vehicle 1. An example of the vehicle 1 is a sedan-type four-wheel passenger car. The vehicle 1 may be such a four-wheel vehicle, a two-wheel vehicle, or a vehicle of another type.

The vehicle 1 includes a control device 2 for a vehicle (hereinafter simply referred to as a "control device 2") that controls the vehicle 1. The control device 2 includes a plurality of ECUs 20 to 29 that are communicably connected to each other via an in-vehicle network. Each ECU includes a processor represented by a CPU, a memory such as a semiconductor memory, an interface with an external device, and the like. A program that is executed by the processor, data that is used by the processor for processing, and the like are stored in the memory. Each ECU may also include a plurality of processors, a plurality of memories, a plurality of interfaces, and the like. For example, the ECU 20 includes a processor 20a and a memory 20b. As a result of commands included in a program stored in the memory 20b being executed by the processor 20a, processing is executed by the ECU 20. Alternatively, the ECU 20 may also include a dedicated integrated circuit such as an ASIC for executing the processing by the ECU 20. This also applies to the other ECUs.

The following describes functions and the like of the ECUs 20 to 29. Note that the number of ECUs and functions of the ECUs can be appropriately designed, and the ECUs and the functions in the present embodiment may also be divided or integrated.

The ECU 20 executes control relating to automated driving of the vehicle 1. In the automated driving, at least one of the steering or the speed of the vehicle 1 is automatically controlled.

The ECU 21 controls an electric power steering device 3. The electric power steering device 3 includes a mechanism for steering front wheels in response to a driving operation (steering operation) made by the driver on a steering wheel 31. Also, the electric power steering device 3 includes a motor that generates a driving force for assisting the steering operation or automatically steering the front wheels, a sensor that detects a steering angle, and the like. If the vehicle 1 is in an automated driving state, the ECU 21 automatically controls the electric power steering device 3 following an instruction from the ECU 20 to control the travelling direction of the vehicle 1.

The ECUs 22 and 23 control detection units 41 to 43 for detecting conditions of a surrounding region of the vehicle and perform information processing of detection results. The detection units 41 are cameras (hereinafter may be referred to as "cameras 41") that capture images of a region in front of the vehicle 1, and are attached to the interior side of a front window in a front region of a roof of the vehicle 1 in the present embodiment. Contours of an object and a mark line (e.g., a white line) of a lane on a road can be extracted by analyzing images captured by the cameras 41.

The detection units 42 are LIDARs (Light Detection and Ranging, hereinafter may be referred to as "LIDARs 42"), and detect objects around the vehicle 1 and measure a distance to an object, for example. In the present embodiment, five LIDARs 42 are provided, two of them being respectively installed in front corner portions of the vehicle 1, one being installed in a rear center portion, and two being respectively installed in rear side portions. The detection units 43 are millimeter-wave radars (hereinafter may be referred to as "radars 43"), and detect objects around the vehicle 1 and measure a distance to an object, for example. In the present embodiment, five radars 43 are provided, one of them being installed in a front center portion of the vehicle 1, two being respectively installed in front corner portions, and two being respectively installed in rear corner portions.

The ECU 22 controls one of the cameras 41 and each LIDAR 42, and performs information processing of detection results. The ECU 23 controls the other camera 41 and each radar 43, and performs information processing of detection results. Reliability of detection results can be improved as a result of two sets of devices that detect conditions of a surrounding region of the vehicle being provided, and multifaceted analysis of a surrounding environment of the vehicle can be performed as a result of different types of detection units such as the cameras, the LIDARs, and the radars being provided.

The ECU 24 controls a gyroscope sensor 5, a GPS sensor 24b, and a communication device 24c, and performs information processing of detection results and communication results. The gyroscope sensor 5 detects a rotational movement of the vehicle 1. The course of the vehicle 1 can be determined based on a result of detection performed by the gyroscope sensor 5, a wheel speed, and the like. The GPS sensor 24b detects a current position of the vehicle 1. The communication device 24c performs wireless communication with a server that provides map information and traffic information, and acquires these types of information. The ECU 24 can access a database 24a of map information that is constructed in a memory, and finds a route from the current position to a destination, for example. The ECU 24, the map database 24a, and the GPS sensor 24b constitute what is called a navigation device.

The ECU 25 includes a communication device 25a for inter-vehicle communication. The communication device 25a performs wireless communication with another vehicle that is in a surrounding region, and exchanges information with the other vehicle. A TCU (Telematics Control Unit) 30 communicates with a network using a cellular communication line. The TCU 30 may also perform communication using Wi-Fi (registered trademark), DSRC (Dedicated Short Range Communications), or the like.

The ECU 26 controls a power plant 6. The power plant 6 is a mechanism that outputs a driving force for rotating driving wheels of the vehicle 1, and includes an engine and a transmission, for example. The ECU 26 controls output of the engine in response to a driving operation (an operation made on an accelerator or an acceleration operation) that is made by the driver and detected by an operation detection sensor 7a provided in an acceleration pedal 7A, and switches a gear range of the transmission based on information regarding a vehicle speed or the like that is detected by a vehicle speed sensor 7c, for example. If the vehicle 1 is in the automated driving state, the ECU 26 automatically controls the power plant 6 following an instruction from the ECU 20 to control acceleration and deceleration of the vehicle 1.

The ECU 27 controls lighting devices (headlights, taillights, etc.) including direction indicators 8 (blinkers). In the example shown in FIG. 1, the direction indicators 8 are provided in a front portion, door mirrors, and a rear portion of the vehicle 1.

The ECU 28 controls an input/output device 9. The input/output device 9 outputs information to the driver and accepts input of information from the driver. An audio output device 91 gives information to the driver using sound. A display device 92 gives information to the driver by displaying images. The display device 92 is arranged in a surface in front of the driver's seat, for example, and constitutes an instrument panel or the like. Note that information is given using sound and display in this example, but information may also be given using vibration or light. Also, information may also be given using a combination of two or more of sound, display, vibration, and light. Furthermore, it is also possible to vary the combination or the manner of giving information according to the level (e.g., urgency) of information to be given. An input device 93 is arranged at a position at which the input device can be operated by the driver, and is constituted by a group of switches for giving instructions to the vehicle 1, but may also include an audio input device.

The ECU 29 controls brake devices 10 and a parking brake (not shown). The brake devices 10 are disk brake devices, for example, are respectively provided on the wheels of the vehicle 1, and decelerate or stop the vehicle 1 by applying resistance to rotation of the wheels. The ECU 29 controls operations of the brake devices 10 in response to a driving operation (a brake operation) that is made by the driver and detected by an operation detection sensor 7b provided in a brake pedal 7B, for example. If the vehicle 1 is in the automated driving state, the ECU 29 automatically controls the brake devices 10 following an instruction from the ECU 20 to control deceleration and a stop of the vehicle 1. The brake devices 10 and the parking brake can also operate to maintain a stopped state of the vehicle 1. If the transmission of the power plant 6 includes a parking lock mechanism, it is also possible to cause the parking lock mechanism to operate to maintain the stopped state of the vehicle 1.

An overview of an electronically coupled travelling system will be described with reference to FIG. 2. The electronically coupled travelling system can also be called a platooning system or an electronical traction system. The electronically coupled travelling system is a system in which two or more vehicles travel in an electronically coupled state. The electronically coupled state is a state in which information that is used in travelling of a following vehicle can be provided by a preceding vehicle to the following vehicle when necessary. The electronically coupled following vehicle can automatically follow the preceding vehicle without a driving operation being made by the driver. A person may be present or absent in the driver's seat of the following vehicle. A general configuration of the electronically coupled travelling system may be similar to those in conventional technologies, and therefore the following describes an overview of the general configuration.

FIG. 2 shows examples of functional configurations of a preceding vehicle 200 and a following vehicle 250 that constitute the electronically coupled travelling system. Both the preceding vehicle 200 and the following vehicle 250 may have the same configuration as that of the vehicle 1 shown in FIG. 1. Some of the constitutional elements shown in FIG. 1 are omitted in FIG. 2. Not only a vehicle that is operating as the preceding vehicle 200 (i.e., a vehicle that is actually leading), but also a vehicle that is going to operate as the preceding vehicle 200 will be referred to as the "preceding vehicle 200". Also, not only a vehicle that is operating as the following vehicle 250 (i.e., a vehicle that is actually following), but also a vehicle that is going to operate as the following vehicle 250 will be referred to as the "following vehicle 250".

The preceding vehicle 200 includes a leading information providing unit 201. The leading information providing unit 201 may also be realized by the ECU 20 that executes control relating to automated driving. Alternatively (e.g., if the preceding vehicle 200 does not include an automated driving function), the leading information providing unit 201 may also be realized by another ECU in the control device 2.

The leading information providing unit 201 collects information (hereinafter referred to as "travelling information") regarding travelling of the preceding vehicle 200 such as amounts of operations made by the driver on the acceleration pedal 7A, the brake pedal 7B, and the steering wheel 31 and a vehicle speed detected by the vehicle speed sensor 7c. The leading information providing unit 201 generates information (hereinafter referred to as "leading information") that is used by the following vehicle 250 to follow the preceding vehicle 200, based on the travelling information. The leading information providing unit 201 provides the leading information to the following vehicle 250 via the communication device 25a. Communication between the communication device 25a of the preceding vehicle 200 and the communication device 25a of the following vehicle 250 may also be performed as inter-vehicle communication. The preceding vehicle 200 may be manually driven or automatically driven while leading the following vehicle 250.

The following vehicle 250 includes a following unit 251, a start determination unit 252, a user position determination unit 253, and a power supply management unit 254. These constitutional elements may also be realized by the ECU 20 that executes control relating to automated driving. Alternatively (e.g., if the following vehicle 250 does not include an automated driving function), these constitutional elements may also be realized by another ECU shown in FIG. 1 or a dedicated ECU (not shown).

The following unit 251 acquires the leading information from the preceding vehicle 200 via the communication device 25a. The following unit 251 automatically controls travelling of the following vehicle 250 (specifically, driving amounts of actuators relating to driving, braking, and steering) to follow the preceding vehicle 200, based on the leading information. The following unit 251 may also control travelling of the following vehicle 250 to follow the preceding vehicle 200, further based on a distance, a speed, an angle, or the like relative to the preceding vehicle 200, which is acquired by the detection units 41 to 43. The following vehicle 250 may also follow the preceding vehicle 200 by travelling along the same path as the preceding vehicle 200 (e.g., such that tracks of the center of the vehicle width of the preceding vehicle 200 match tracks of the center of the vehicle width of the following vehicle 250). The following unit 251 may cause the following vehicle 250 to follow the preceding vehicle 200 such that the distance between the preceding vehicle 200 and the following vehicle 250 is kept constant or the distance is varied according to the vehicle speed by, for example, making the distance short when the following vehicle 250 stops or travels at a low speed, and making the distance long when the following vehicle 250 travels at a high speed. When the vehicles are travelling, the distance between the preceding vehicle 200 and the following vehicle 250 may be a short distance (e.g., 1 m) that keeps another vehicle from entering between the preceding vehicle 200 and the following vehicle 250, and when the vehicles are stopped, the distance between the preceding vehicle 200 and the following vehicle 250 may be a shorter distance (e.g., 50 cm) that makes a pedestrian hesitate to enter between the preceding vehicle 200 and the following vehicle 250.

The start determination unit 252 determines whether to allow the following unit 251 to start to follow the preceding vehicle 200. Specifically, the start determination unit 252 may make this determination based on at least one of whether a user of the following vehicle 250 is inside the following vehicle 250 or an instruction from the user of the following vehicle 250. Hereinafter, the "user of the following vehicle 250" will be simply referred to as the "user". The term "user" refers to a person who uses the following vehicle 250 in a suitable manner. The user may be present inside the following vehicle 250 or outside the following vehicle 250 while the following vehicle 250 is following the preceding vehicle. If there is an occupant in the following vehicle 250, the occupant may also be the user. If there is no occupant in the following vehicle 250 (e.g., if an unmanned following vehicle 250 is led), a person who requests leading may also be the user.

The start determination unit 252 may also determine whether to allow the following unit 251 to start to follow the preceding vehicle 200, in accordance with a setting table 300 shown in FIG. 3. The setting table 300 is stored in a storage unit (e.g., the memory 20b) of the control device 2. A column 301 in the setting table 300 indicates whether the user is inside the vehicle or outside the vehicle. A column 302 in the setting table 300 indicates operations of the start determination unit 252. The column 302 can take values of "ask", "allow", and "forbid", for example.

"Ask" indicates that the start determination unit 252 asks the user as to whether to allow a start to follow. "Allow" indicates that the start determination unit 252 allows a start to follow without asking the user. "Forbid" indicates that the start determination unit 252 forbids a start to follow without asking the user. In the case of setting values shown in FIG. 3, if the user is inside the vehicle, the start determination unit 252 starts following without asking the user, and if the user is outside the vehicle, the start determination unit 252 asks the user whether to allow a start to follow. These setting values are merely examples, and a configuration is also possible in which the setting table 300 does not include some of these setting values or includes another setting value.

The start determination unit 252 can change setting values in the setting table 300, following an instruction from the user. The user may specify setting values in the setting table 300 using the input device 93 of the following vehicle 250, for example. Alternatively, the user may specify setting values in the setting table 300 using a mobile terminal (e.g., a mobile phone or a smartphone) of the user. In a case where a mobile terminal is used, a configuration is also possible in which an application that is installed into the mobile terminal acquires an instruction from the user, and transmits the instruction to the control device 2 of the following vehicle 250. Communication between the control device 2 of the following vehicle 250 and the mobile terminal may be short-range communication such as Bluetooth (registered trademark) or communication performed via a cellular network. The user may specify the setting values inside the following vehicle 250 or from the outside of the following vehicle 250.

In a first scenario, a user who wants to start to sleep while waiting for the arrival of the preceding vehicle 200 sets "allow" as a value in the column 302 corresponding to "inside the vehicle". This user sets "forbid" as a value in the column 302 corresponding to "outside the vehicle" in case the user temporarily goes outside the vehicle before the preceding vehicle 200 arrives. In a second scenario, a user who lets an unmanned following vehicle 250 be led sets "allow" as a value in the column 302 corresponding to "outside the vehicle". On the other hand, the user sets "ask" as a value in the column 302 corresponding to "inside the vehicle" in order to have a time for coming out of the vehicle if leading is likely to be started when the user is inside the vehicle. In a third scenario, a user who carries cargo using the following vehicle 250 sets "ask" as values in the column 302 corresponding to "inside the vehicle" and "outside the vehicle" in order to allow a start to follow according to conditions of loading. As described above, according to the present embodiment, it is possible to start to follow the preceding vehicle 200 as intended by the user.

The setting table 300 prescribes operations of the start determination unit 252 for "inside the vehicle" and "outside the vehicle", respectively. Alternatively, the setting table 300 may also prescribe an operation that is common to "inside the vehicle" and "outside vehicle" in a case where the start determination unit 252 determines whether to allow a start to follow regardless of whether the user is inside the following vehicle 250. In this case, the start determination unit 252 makes the determination based on an instruction from the user regardless of whether the user is inside the following vehicle 250. A configuration is also possible in which the column 302 in the setting table 300 cannot be changed by an instruction from the user, and indicates fixed values at the time of shipment, for example. In this case, the start determination unit 252 makes the determination based on whether the user is inside the following vehicle 250, rather than an instruction from the user.

The user position determination unit 253 determines whether the user is inside the following vehicle 250. The user position determination unit 253 may also determine whether the user is inside the following vehicle 250 based on at least one of opening/closing of a door of the following vehicle 250, output from a seatbelt sensor of the following vehicle 250, output from a seating sensor of the following vehicle 250, or position information regarding a mobile terminal of the user. For example, if the door has been opened and closed an even number of times after the following vehicle 250 stopped, the user position determination unit 253 may determine that the user is inside the vehicle, and if the door has been opened and closed an odd number of times after the following vehicle 250 stopped, the user position determination unit 253 may determine that the user is outside the vehicle. The user position determination unit 253 may also determine that the user is inside the vehicle upon detecting that a seatbelt is tightened based on output from the seatbelt sensor of the following vehicle 250.

The user position determination unit 253 may also determine that the user is inside the vehicle upon detecting that an occupant is sitting on a seat based on output from the seating sensor of the following vehicle 250. The user position determination unit 253 may also determine that the user is inside the vehicle if a geographical position of the mobile terminal of the user matches a geographical position of the following vehicle 250.

The power supply management unit 254 automatically turns an ignition (IG) power supply of the following vehicle 250 ON/OFF from a state where an accessory (ACC) power supply of the following vehicle 250 is turned ON. The IG power supply is a travelling power supply of the following vehicle 250.

Figure 4:
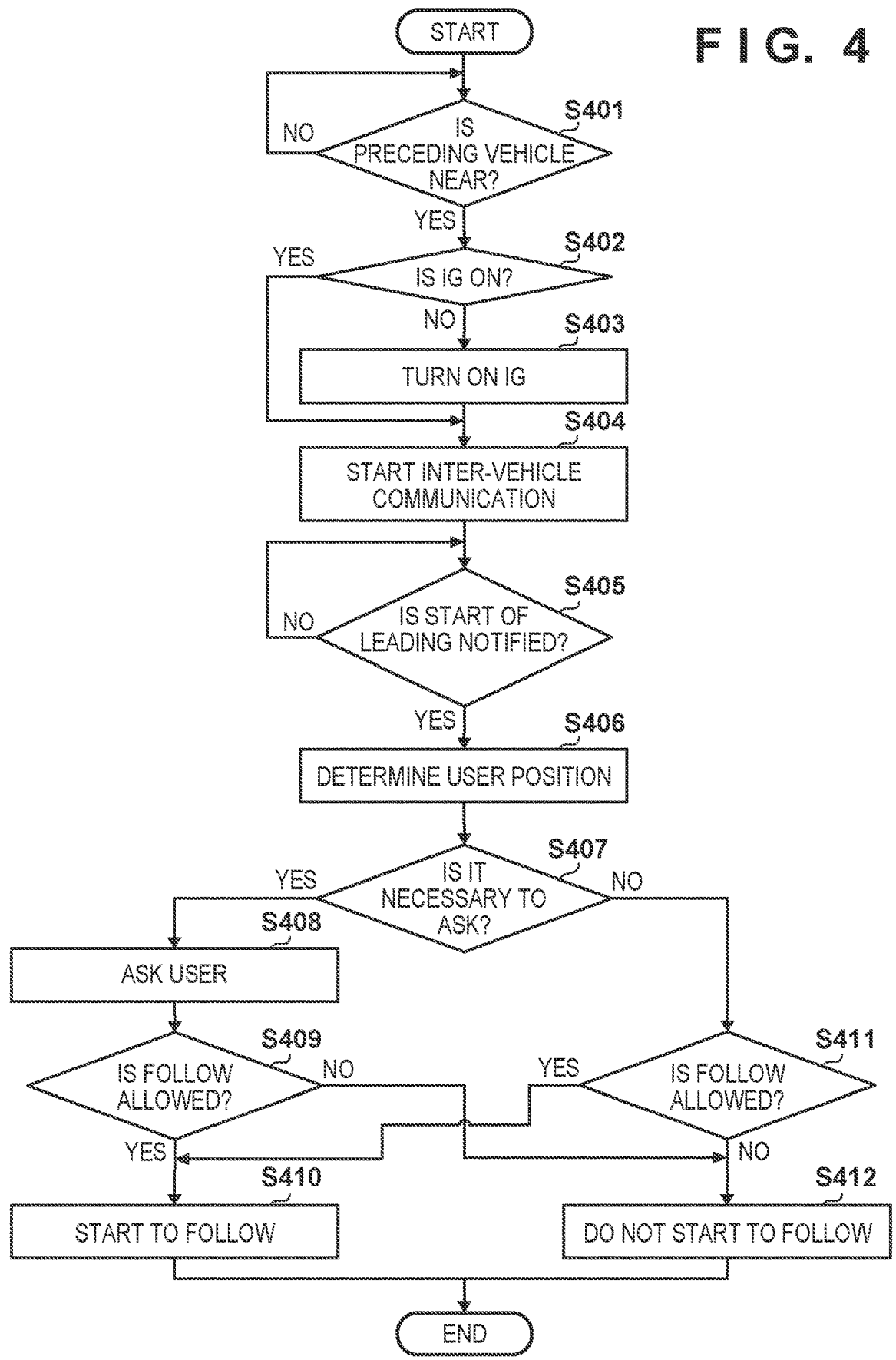
FIG. 4 is a flowchart showing an example operation of a control device of a following vehicle according to various embodiments.

An example operation of the following vehicle 250 when the following vehicle 250 starts to follow will be described with reference to FIG. 4. The example operation shown in FIG. 4 is executed by the control device 2 of the following vehicle 250. This operation may also be performed as a result of a processor (e.g., the processor 20*a*) of the control device 2 executing a program stored in a memory (e.g., the memory 20*b*). Alternatively, some or all steps of the operation shown in FIG. 4 may also be executed by a dedicated circuit. Assume that at the start of the operation shown in FIG. 4, the following vehicle 250 is stopping and waiting to be led by the preceding vehicle 200. The user may be inside the following vehicle 250 or outside the following vehicle 250. The preceding vehicle 200 approaches the following vehicle 250 to start to lead the following vehicle 250. A geographical position of the following vehicle 250 and appearance features of the following vehicle 250 are provided to the preceding vehicle 200, and the preceding vehicle 200 finds the following vehicle 250 based on this information.

In step S401, the control device 2 of the following vehicle 250 (in the following description of FIG. 4, the "control device 2 of the following vehicle 250" will be simply referred to as the "control device 2") determines whether the preceding vehicle 200 is near the following vehicle 250. If the preceding vehicle 200 is near the following vehicle 250 ("YES" in step S401), the control device 2 proceeds to step S402, otherwise ("NO" in step S401) repeats step S401. For example, if inter-vehicle communication can be performed with the preceding vehicle 200, the control unit 2 may determine that the preceding vehicle 200 is near the following vehicle 250. Alternatively, the control device 2 may compare a current position of the following vehicle 250 acquired by the GPS sensor 24*b* and a current position of the preceding vehicle 200 acquired via cellular communication, and if the distance between the current positions is no greater than a threshold value (e.g., 10 m), the control unit 2 may determine that the preceding vehicle 200 is near the following vehicle 250.

In step S402, the control device 2 determines whether the IG power supply of the following vehicle 250 has been turned ON. If the IG power supply of the following vehicle 250 has been turned ON ("YES" in step S402), the control device 2 proceeds to step S404, otherwise ("NO" in step S402) proceeds to step S403. In step S403, the control device 2 activates the IG power supply of the following vehicle 250. As a result, the following vehicle 250 is enabled to generate a motive power to follow the preceding vehicle 200. In step S404, the control device 2 starts inter-vehicle communication with the preceding vehicle 200.

In step S405, the control device 2 determines whether a notification indicating that leading will be started has been received from the preceding vehicle 200. Upon having received a notification indicating that leading will be started, from the preceding vehicle 200 ("YES" in step S405), the control device 2 proceeds to step S406, otherwise ("NO" in step S405) repeats step S405. The preceding vehicle 200 transmits this notification to the following vehicle 250 when arriving at a position at which the preceding vehicle 200 can start to lead the following vehicle 250. This notification may be transmitted via inter-vehicle communication or a network.

In step S406, the control device 2 determines whether the user is inside the following vehicle 250. Methods for making this determination are as described above with reference to FIG. 2.

In step S407, the control device 2 determines whether it is necessary to ask the user in order to allow a start to follow. If it is necessary to ask the user in order to allow a start to follow ("YES" in step S407), the control device 2 proceeds to step S408, otherwise ("NO" in step S407) proceeds to step S411. Specifically, the control device 2 identifies an operation that is to be performed by the control device 2 by applying the result of determination made in step S406 to the setting table 300. If the identified operation is "ask", the control device 2 determines that it is necessary to ask the user. If the identified operation is other than "ask", the control device 2 determines that it is unnecessary to ask the user.

The setting table 300 has been prescribed before step S407. Specifically, the setting table 300 may be prescribed based on an instruction from the user that had been acquired before the following vehicle 250 started inter-vehicle communication with the preceding vehicle 200 in step S404.

In step S408, the control device 2 asks the user whether to allow a start to follow. This inquiry may also be made using the display device 92 of the following vehicle 250. Instead of or in addition to the above, this inquiry may also be made using a mobile terminal of the user. The control device 2 may acquire a reply to the inquiry via the input device 93 or the mobile terminal of the user.

In step S409, the control device 2 determines whether to allow a start to follow based on the reply of the user. If the control device 2 allows a start to follow ("YES" in step S409), the control device 2 proceeds to step S410, otherwise ("NO" in step S409) proceeds to step S412.

In step S410, the control device 2 starts to follow the preceding vehicle 200. Specifically, in response to the notification received in step S405, the control device 2 requests to start leading. This request may be made via inter-vehicle communication or a network. Thereafter, the control device 2 controls travelling of the following vehicle 250 to follow the preceding vehicle 200 based on information received from the preceding vehicle 200.

In step S412, the control device 2 does not start to follow the preceding vehicle 200. Specifically, in response to the notification received in step S405, the control device 2 requests not to start leading. This request may be made via inter-vehicle communication or a network. The control device 2 may also give a notification to the preceding vehicle 200 to request to wait at the current position or cancel a request for leading. This notification may also be given following an instruction from the user.

In step S411, the control device 2 determines whether to allow a start to follow based on settings in the setting table 300. If the control device 2 allows a start to follow ("YES" in step S411), the control device 2 proceeds to step S410, otherwise ("NO" in step S411) proceeds to step S412. Operations in steps S410 and S412 are as described above.

Summary of Embodiment

Item 1

A control device (2) of a vehicle (1), the device including:

a travel control unit (251) configured to control travelling of the vehicle such that the vehicle follows another vehicle (200), based on information received from the other vehicle; and a determination unit (252) configured to determine whether to allow the travel control unit to start to follow another vehicle based on at least one of whether a user of the vehicle is inside the vehicle or an instruction from the user, wherein the travel control unit starts to follow another vehicle in a case where the travel control unit is allowed to follow the other vehicle by the determination unit.

According to this item, it is possible to start to follow the preceding vehicle as intended by the user of the following vehicle.

Item 2

The control device according to Item 1, wherein the determination unit determines whether to allow the travel control unit to start to follow another vehicle at least based on the instruction from the user.

According to this item, it is possible to start to follow the preceding vehicle according to the instruction from the user.

Item 3

The control device according to Item 2, wherein the determination unit determines, based on an instruction from the user, whether to ask the user as to whether to allow a start to follow another vehicle.

According to this item, whether to ask can be set in advance.

Item 4

The control device according to Item 2 or 3, wherein the determination unit determines whether to allow the travel control unit to start to follow another vehicle based on the instruction from the user that is acquired before the vehicle starts inter-vehicle communication with the other vehicle.

According to this item, it is possible to allow for enough time to set whether to ask.

Item 5

The control device according to any one of Items 1 to 4, wherein the determination unit determines whether to allow the travel control unit to start to follow another vehicle at least based on whether the user is inside the vehicle.

According to this item, it is possible to start to follow the preceding vehicle according to the position of the user.

Item 6

The control device according to Item 5, wherein the determination unit determines whether the user is inside the vehicle based on at least one of opening/closing of a door of the vehicle, output from a seatbelt sensor of the vehicle, output from a seating sensor of the vehicle, or position information regarding a mobile terminal of the user.

According to this item, whether the user is inside the vehicle can be accurately determined.

Item 7

The control device according to any one of Items 1 to 6, further including a power supply management unit (254) configured to activate a travelling power supply of the vehicle in response to another vehicle having approached the vehicle.

Item 8

A vehicle including the control device according to any one of Items 1 to 7.

According to this item, a vehicle having the advantages described above is provided.

The invention is not limited to the foregoing embodiments, and various variations/changes are possible within the spirit of the invention.

What is claimed is:

1. A control device of a vehicle, the device comprising:
a memory for storing computer readable code; and
a processor operatively coupled to the memory, the processor configured to:
control travelling of the vehicle such that the vehicle follows another vehicle based on information received from the other vehicle; and
determine whether to allow the vehicle to start to follow the other vehicle based on at least one of whether a user of the vehicle is inside the vehicle or an instruction from the user,
wherein the processor starts to follow the other vehicle in a case where the vehicle is allowed to follow the other vehicle, and
wherein whether to ask the user as to whether to allow the vehicle to start to follow the other vehicle is set separately for a case where the user is inside the vehicle and a case where the user is outside the vehicle.

2. The control device according to claim 1,
wherein the processor determines whether to allow the vehicle to start to follow the other vehicle at least based on the instruction from the user.

3. The control device according to claim 2,
wherein the processor determines, based on the instruction from the user, whether to ask the user as to whether to allow to start to follow the other vehicle.

4. The control device according to claim 2,
wherein the processor determines whether to allow the vehicle to start to follow the other vehicle based on the instruction from the user that is acquired before the vehicle starts inter-vehicle communication with the other vehicle.

5. The control device according to claim 1,
wherein the processor determines whether to allow the vehicle to start to follow the other vehicle at least based on whether the user is inside the vehicle.

6. The control device according to claim 5,
wherein the processor determines whether the user is inside the vehicle based on at least one of opening/closing of a door of the vehicle, output from a seatbelt sensor of the vehicle, output from a seating sensor of the vehicle, or position information regarding a mobile terminal of the user.

7. The control device according to claim 1, wherein the processor is further configured to activate a travelling power supply of the vehicle in response to the other vehicle having approached the vehicle.

8. The vehicle comprising the control device according to claim 1.

9. The control device according to claim 1, wherein
in a case where it is set to ask the user as to whether to allow the vehicle to start to follow the other vehicle, the processor determines whether to allow the vehicle to start to follow the other vehicle based on a response from the user, and
in a case where it is not set to ask the user as to whether to allow the vehicle to start to follow the other vehicle, the processor determines whether to allow the vehicle to start to follow the other vehicle without asking the user.

* * * * *